(12) United States Patent
Helot et al.

(10) Patent No.: US 11,562,688 B2
(45) Date of Patent: Jan. 24, 2023

(54) DISPLAY DEVICE AND A VEHICLE WITH THE DISPLAY DEVICE

(71) Applicant: AUDI AG, Ingolstadt (DE)

(72) Inventors: Jacques Helot, Ingolstadt (DE); Joris Mertens, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/413,298

(22) PCT Filed: Nov. 25, 2019

(86) PCT No.: PCT/EP2019/082424
§ 371 (c)(1),
(2) Date: Jun. 11, 2021

(87) PCT Pub. No.: WO2020/126329
PCT Pub. Date: Jun. 25, 2020

(65) Prior Publication Data
US 2022/0068199 A1 Mar. 3, 2022

(30) Foreign Application Priority Data
Dec. 17, 2018 (EP) .................................. 18212972

(51) Int. Cl.
*B60K 37/02* (2006.01)
*G09G 3/3208* (2016.01)
(Continued)

(52) U.S. Cl.
CPC ........... *G09G 3/3208* (2013.01); *B60K 35/00* (2013.01); *G06V 40/10* (2022.01); *G06V 40/172* (2022.01);
(Continued)

(58) Field of Classification Search
CPC .............. B60K 37/02; B60K 2370/149; B60K 2370/343; B60K 2370/349;
(Continued)

(56) References Cited

U.S. PATENT DOCUMENTS

2011/0286073 A1* 11/2011 Lo ...................... G02B 26/005
359/290
2016/0059783 A1* 3/2016 Sisbot ..................... G06T 3/20
340/901
(Continued)

FOREIGN PATENT DOCUMENTS

CN 107402736 A 11/2017
DE 202 19 783 U1 4/2003
(Continued)

OTHER PUBLICATIONS

Extended European Search Report dated Jun. 5, 2019 for European Application No. 18212972.6.
(Continued)

*Primary Examiner* — Christopher E Leiby
(74) *Attorney, Agent, or Firm* — Staas & Halsey LLP

(57) ABSTRACT

A display panel has a first panel side and a second panel side, both capable of displaying graphic display object(s). The display panel has a pixel layer, control circuitry and a sensor unit which identify the presence of at least one person at a predefined threshold distance from the display device and whether the at least one person is on the first panel side or the second panel side. The control circuitry is adapted to enable the displaying of the graphic display object in accordance with a predefined display alignment in one of a first orientation and a second orientation based on a physical environment condition.

15 Claims, 8 Drawing Sheets

(51) Int. Cl.
  *G06V 40/16* (2022.01)
  *B60K 35/00* (2006.01)
  *G09G 3/20* (2006.01)
  *G06V 40/10* (2022.01)

(52) U.S. Cl.
  CPC ........ *G09G 3/2085* (2013.01); *B60K 2370/12* (2019.05); *B60K 2370/152* (2019.05); *B60K 2370/21* (2019.05); *G06T 2207/30196* (2013.01); *G06T 2207/30248* (2013.01); *G09G 2340/0492* (2013.01); *G09G 2380/10* (2013.01)

(58) Field of Classification Search
  CPC ............ B60K 2370/1523; G09G 5/10; G09G 2320/0626; G09G 2380/10
  See application file for complete search history.

(56) References Cited

U.S. PATENT DOCUMENTS

| | | | |
|---|---|---|---|
| 2016/0236612 A1 | 8/2016 | Caron | |
| 2016/0363991 A1* | 12/2016 | Schlecht | B60K 35/00 |
| 2017/0240096 A1* | 8/2017 | Ross | B60Q 5/005 |
| 2018/0128044 A1* | 5/2018 | Ochiai | E06B 9/24 |
| 2018/0182314 A1* | 6/2018 | Staton | A61G 11/00 |
| 2018/0188531 A1* | 7/2018 | Dubey | H01L 27/3232 |
| 2019/0146216 A1* | 5/2019 | Mourou | B60J 1/02 280/781 |
| 2019/0213931 A1* | 7/2019 | Brubaker | G06Q 30/0266 |
| 2019/0258873 A1* | 8/2019 | Kishimoto | B60R 11/0235 |
| 2019/0265703 A1* | 8/2019 | Hicok | G05D 1/0242 |
| 2019/0383091 A1* | 12/2019 | Wilson | G06F 3/0346 |
| 2020/0180436 A1* | 6/2020 | Obiagwu | B60W 50/10 |
| 2020/0250553 A1* | 8/2020 | Tomaru | G01S 17/06 |
| 2020/0394949 A1* | 12/2020 | Kimmel | G09G 3/2085 |
| 2021/0003414 A1* | 1/2021 | Yamaguchi | G09G 5/38 |

FOREIGN PATENT DOCUMENTS

| | | |
|---|---|---|
| DE | 10 2012 019 506 A1 | 4/2014 |
| DE | 10 2015 200 233 A1 | 7/2016 |
| EP | 2 500 814 A2 | 9/2012 |
| EP | 18212972.6 | 12/2018 |
| JP | 2018-169580 A | 11/2018 |
| WO | PCT/EP2019/082424 | 11/2019 |

OTHER PUBLICATIONS

Translation by WIPO of International Preliminary Report on Patentability for PCT/EP2019/08242 dated Jun. 16, 2021, 8 pp.
International Search Report dated Jan. 27, 2020 for International Application No. PCT/EP2019/082424.

* cited by examiner

DISPLAY DEVICE AND A VEHICLE WITH THE DISPLAY DEVICE

CROSS REFERENCE TO RELATED APPLICATIONS

This application is a U.S. national stage of International Application No. PCT/EP2019/082424, filed on Nov. 25, 2019. The International Application claims the priority benefit of European Application No. 18212972.6 filed on Dec. 17, 2018. Both the International Application and the European Application are incorporated by reference herein in their entirety.

BACKGROUND

Described below are a display device and a vehicle with such a display device. The display device is designed to display at least one graphic display object on two opposite sides of a display panel such that an orientation of the at least one graphic display object is adapted according to a position of an observer.

Nowadays a display device has become an integral part of a vehicle. The display device usually has a display panel (with or without touch screen functionality) which usually functions as a user interface. This enables a user, who can be the driver of the vehicle, to communicate with and/or to operate other devices in the vehicle using the display panel or the touchscreen. In this way, operating functions or driver assistance functions of the other devices of the vehicle can be made available to a user for selection. Usually, display devices are integrated within a dashboard or within a central console of the vehicle. With an increasing number of operating and comfort functions available for the user in the vehicle, it is necessary on one hand to enable a simplified operation of these functions and on the other hand to present a multitude and/or different types of information in a clear and understandable manner to the user.

In this context, it would be of advantage if the user and/or the vehicle could communicate with other persons outside the vehicle via the display panel. Furthermore, it would be of advantage if the display panel would be accessible at different positions of the user. However, space restrictions in a vehicle make it difficult to integrate an extra display panel for such a functionality. In addition, an extra display device makes it difficult to achieve a modern and uncluttered interior design of the vehicle. Furthermore, putting a display device at the exterior of the vehicle makes it vulnerable, since it is easily damaged and is more exposed to very high or very low temperatures making it tougher to display well. Moreover, snow and/or rain can block display content of the display panel.

Document DE 10 2012 019 506 A1 discloses a vehicle with a window pane, a partial area of which is used as a display area of a display instrument. The partial area of the window pane can be switched between two states with different light transmission behavior. However, a display of information towards outside is not disclosed.

Document DE 10 2015 200 233 A1 discloses a device and method for informing a driver of a vehicle, in particular a passenger motor vehicle, outside the vehicle, during an automatic parking operation with a display which is designed to be retractable and retractable between a retracted nonuse position and an extended display setting from and into the dashboard, and with a drive mechanism for extending and retracting the latter. The drive mechanism is additionally equipped for the taking a specific information position for informing the driver outside the vehicle. However, a display of information towards inside and outside the vehicle at a same time is not disclosed Document US 2016/0236612 A1 discloses a user interface system with a user interface control module, an image display mechanism and a sensor unit. The image display mechanism includes a projector adapted to project a plurality of images, for example on a window panel of a vehicle, when a driver approaches the vehicle. Thus, providing information when the driver is outside the vehicle.

SUMMARY

Described herein is a display device for a vehicle which provides a display of display contents for at least one person or a user inside the vehicle as well as for at least one person or a user outside the vehicle such that an orientation of the display content is adapted according to a position of the at least one person and enables the display device to be integrated in the vehicle in such a manner that only a small perceived space in an interior room of the vehicle is occupied by the display device and is protected from the outside.

Advantageous developments with convenient and non-trivial further embodiments are specified in the following description and the drawings.

To ensure a two-sided display of information with low requirement of space, the display device includes a display panel with a first panel side and a second panel side, wherein the display panel allows an adjustable degree of light transmission. In other words, the display panel can be turned transparent. In other words, when the display panel is not actuated, it allows a view through the display into the surroundings of the vehicle. The display panel is designed to display at least one graphic display object, for example, a logo and/or a user interface of an app (software application). The display panel has a pixel layer with a pixel matrix, wherein in a respective unactuated state each pixel element of the pixel matrix is transparent. Moreover, a grid between the pixel elements may be opaque resulting in a transparent appearance. Furthermore, the display device includes control circuitry which is designed to actuate at least one pixel element of the pixel matrix for displaying at least one graphic display object. Furthermore, the at least one graphic display object has a predefined display alignment, such that at least one person or a user is able to perceive the at least one graphic display object. By the term "perceive", it is meant that the at least one person is able to view, read and understand the at least one graphic display object. For example, an English text message has a predefined display alignment from left to right, in order to be perceivable by the user. In a case, when the at least one graphic display object is an image, e.g. an icon, the display alignment can be defined by a data file in which the pixel data of the image are stored, as such the data file defines which part of the image is to be displayed on the left side and which one on the right side.

The pixel layer can be designed as a transparent screen with transparent organic light emitting diodes (TOLED). However, other technologies which could be known to a person with ordinary skill in the related field can be used as the pixel layer of the display panel. As has already be mentioned, in the respective unactuated state, each pixel element of the pixel matrix remains transparent. If at a point of time, the graphic display object is needed to be displayed on a particular location on the display panel, then the control circuitry can activate a plurality of pixel elements at that particular location, which can in turn enable the plurality of pixel elements of that particular location to radiate a monochromatic light or a light of various colors corresponding to the at least one graphic display object. The output of the at least one graphic display object may be requested by a display signal that may be received by the control circuitry. However, the other remaining pixel elements of the pixel layer may correspond to the unactuated state and hence, may remain transparent. This can enable the rest of pixel layer, which is not occupied by the at least one graphic display object to remain transparent.

Furthermore, the display device described herein is based on a realization to solve a problem of communicating with at least one person, for example outside a vehicle, without resorting to a second display panel, that displays towards the outside of the vehicle, for example through the windscreen. Accordingly, the control circuitry is designed to estimate a physical environment condition based on control signal signaled by a sensor unit. The sensor unit is designed to identify a presence of at least one person at a predefined threshold distance from the display device. The control circuitry can in turn enable the displaying of the at least one graphic display object with the predefined alignment on the display panel. This is of advantage, because this enables the activation of the display panel only at the presence of the at least one of the person near the display device, so that it can be insured that the information represented by the at least one graphic displayed object is only visually accessible to the at least one person, only when the person lies or approaches within the predefined threshold distance from the display device. Furthermore, this ensures the conservation of energy, since the display panel can be switched on or activated only in the presence of the at least one person near the display device, rather than that the display panel is switched on in a continuous manner even in the absence of any person in near the display device or when the person is far away from the display device.

Furthermore, the sensor unit is designed to distinguish if the at least one person is on the first panel side or on the second panel side. To this end, the sensor unit may be a camera or a capacitive sensor or a photoelectric sensor or an inductive proximity sensor or an ultrasonic sensor or a radar sensor. Such a sensor unit can be installed on an outer surface of a vehicle, such that, when the at least one person lies or approaches within a predefined distance from the display device, then the presence of the at least one of person can be identified and the control signal can be sent from the sensor unit to the control circuitry. In other words, the physical environment condition may include information regarding the presence of the at least one person within the predefined threshold distance from the display device and regarding on which side the at least one person is positioned at a given point of time. The at least one person can also be identified through the person's mobile electronic device, such as a smartphone or tablet or watch, through which a person can be identified.

Based on the physical environment condition, the control circuitry is adapted to enable the displaying of the at least one graphic display object in accordance with the predefined display alignment in one of a first orientation and a second orientation. In other words, on the basis the determined physical condition, the control circuitry enables the selection of the first orientation and or the second orientation in the respective predefined alignment of the at least one graphic display object, that is to be displayed on a respective predetermined location of the display panel. Based on the selection of the orientation of the graphic display object to be displayed, the graphic display object may be outputted by the actuation of the plurality of pixel elements corresponding to the predetermined location by the control circuitry, as per the display signal. For example, an English text message (with its predefined display alignment pointing from left to right) can presented in the perceivable first orientation or in a horizontally mirrored second orientation. In the first orientation, the at least one graphic display object is perceivable on the first panel side in the predefined display alignment. In other words, the at least one graphic display object in the first orientation corresponding to the predefined display alignment, such that the at least one person, for example, sitting inside the vehicle, is able to perceive the at least one graphic display object displayed on the first panel side of the display panel. Regarding the above example of the English text message, this text would be readable from left to right from inside the vehicle.

However, if the at least one person is on the second panel side of the display panel, that is outside the vehicle, then the at least one person must be able to perceive the at least one graphic display object through the windscreen of vehicle. If the at least one graphic display object in this case is the English text, it must be displayed in an alignment pointing from left to right. Thus, the at least one graphic display object is displayed in the second orientation by the pixel layer so that the at least one person on the second panel side can be able to perceive the at least one graphic display object with the predefined display alignment.

For example, the graphic display object can be a text message which is to perceivable as "XY" by at least one person or a user outside the vehicle, that is from the second panel side (reading first X than Y when read in the correct, predefined alignment). The text message "XY" can be outputted as a mirrored image "YX" by the activation of the corresponding pixel elements of the first layer on the first panel side of the display panel, so that when viewed by the at least one person from outside the vehicle, the outputted text message is perceived as "XY", i.e. in the predefined alignment. The embodiments provide features which afford additional technical advantages.

In one embodiment, the display panel may include a blocking layer which may have a total surface area of the same size or at least 80% of the size of the pixel layer and can be attached to the pixel layer mechanically or be glued or laminated, which can be chosen by a person with ordinary skill in the related field. The blocking layer may have predetermined subareas each having an adjustable degree of light transmission. The subareas can be for example, in a quadrilateral and/or a triangular and/or a polygonal shape. Moreover, the subareas can be of different shapes distributed over the entire surface area of the blocking layer. The subareas can be arranged in such a manner, that they are distributed over the entire surface area of the blocking layer. The subareas of the blocking layer can be designed to allow a transmission of electricity or are electrically conductive. In order to achieve an adjustable degree of light transmission, a voltage difference can be enabled across each of the subareas. This can enable a transformation of each of the subareas from a transparent state to an opaque state depending on the degree of the voltage difference across that particular subarea. For example, the blocking layer can be a so called polymer dispersed liquid crystal (PDLC) or a thin-film transistor screen (TFT) or a dynamic scattered liquid crystal (DSLC) or a suspended particle device (SPD) or a monochrome transparent segmented liquid crystal device (LCD). For example, in the case of PDLC or DSLC as a technology for the subareas, it is possible to achieve different degrees of transparency dynamically by adjusting the voltage difference. However, it is to be noted that PDLC, DSLC, SPD screens are all not light emitting and can display a color or a grey tone but cannot emit light. Such screens function when there is a backlight, since they are not perceivable in the dark.

The control circuitry may be adapted to adjust a respective light transmission to a predetermined individual degree for each of the plurality of the predetermined subareas independent of the remaining respective subareas. In other words, in order to transform or adjust a particular subarea from a transparent state to an opaque state or in between the transparent state and opaque state, as in the case of PDLC or DSLC, or to adjust the predetermined degree of light transmission to a particular subarea, the control circuitry can adjust a voltage difference across the particular subarea in such a manner, that the particular subarea is transformed to the opaque state as per requirement. This can be done in such a manner, that the other remaining subareas remain unaltered and remain in the transparent state. The degree of light transmission can be requested by a transparency signal. For example, a particular predetermined region of the blocking layer can be located behind the pixel matrix of the pixel layer. The degree of light transmission of the particular predetermined region of the display panel can be adjusted by the control circuitry, such that the respective predetermined region can be adjusted between the transparent state, in which the degree of light transmission for example is at least 40 percent and/or at least 50 percent and/or 60 percent and/or 70 percent and/or 80 percent and the opaque state, in which the light transmission is less than 30 percent and/or less than 20 percent and/or less than 10 percent. In the transparent state, a room and/or an environment corresponding to the field of vision of the at least one person behind the display panel (i.e. on the second panel side) can thus be visible through the display panel in the predetermined subareas which are in the transparent state. In a transparent state, for example, with 50 percent of light transmission and with enough light from the outside, the display panel may look quite transparent. In other words, at least one person or a user of the vehicle can perceive as if there may be almost no display panel in front of the user, this enables the at least one person to perceive a larger interior space inside the vehicle, which in turn enables the at least one person to feel freer or less cramped. Furthermore, when the at least one person is driving the vehicle manually, the at least one person is then less distracted by the display panel in the transparent state than if the display panel were to appear in the opaque state. Hence, the at least one person can perceive a larger space in the interior room of the vehicle and is not distracted due to the presence of the display panel in front of the user.

Furthermore, the subareas can be separated by a wire-space between each other. This can enable a wiring across the respective subarea. The wiring can enable the adjustment of the voltage difference across that particular subarea. The wire-space can be about 0.1 millimeter in width. In other words, the subareas can be situated at about 0.1 millimeter apart from each other. The wire-space can be larger up to 0.5 mm.

Furthermore, in case of a PDLC or a DSLC screen the plurality of subareas can be in touch with a border of the blocking layer. The subareas can be also in form of floating elements, however, in this case the wire-space needs to be at least 4 mm wide when the PDLC or DSLC is the contact, which can lead to an unattractive pattern. Furthermore, when the contact to the segment is long, that is about at least 30 cm, then the width of the contact needs to be more than 4 mm. However, the pattern can be relatively attractive if the subareas touch the border, when the contact is a wire, as it can be thinner like a segmented liquid crystal device. Furthermore, in the case of a transparent segmented liquid crystal device, the wire-space can be much narrower, about 0.2-0.4 mm.

In order to display the at least one graphic display object at a particular region on the display panel, the subareas of the blocking layer corresponding to that particular region that needs to be occupied by the at least one graphic display object can be transformed to an opaque state, if visibility of the at least one graphic display object is only required for the first panel side. The pixel elements, for example of the transparent OLED, of the pixel layer lying above the subareas in the opaque state can be activated by the control circuitry so that the transparent OLEDs radiate colors according to the requirement of the at least one graphic display object. Hence, a display of the at least one graphic display object on the particular region on the display panel is enabled by the control circuitry.

Furthermore, to ensure good visibility, the degree of light transmission of the plurality of subareas that are covered by the graphic display object can be reduced to the opaque state, as per the transparency signal. Furthermore, this ensures that the displayed graphic display object in the first orientation is not displayed outside, hence, not viewable to the at least one person outside the vehicle, since the at least one graphic displayed object is covered by the corresponding plurality of subareas that are adjusted to the opaque state.

Furthermore, the control circuitry may be designed to adjust a respective light transmission to a predetermined individual degree for each of the plurality of the predetermined subareas independent of each of the other subareas in accordance with the determined physical environment condition. This is of advantage, because this can enable a display of a selected form of information represented by the at least one graphic display object in dependence with the predefined physical environment condition. Furthermore, in order to ensure the clear viewability of the at least one graphic display object, which in this case, may be a text message "XY", from outside the vehicle, that is through the second panel side, the degree of light transmission of the plurality of subareas that cover by the graphic display object may be increased to the transparent state, as per the transparency signal. Furthermore, since the environment of an interior room of the vehicle is usually dark, a dark background for the display panel can be ensured. This can enable a clear display of the at least one graphic display object, which is displayed in the second orientation and is perceivable by the at least one person outside the vehicle from the second panel side, for example through the windscreen. Furthermore, such a display device can have a lower weight which is of advantage.

In one embodiment, the display device may have a first reflective layer and a second reflective layer, wherein the display panel may be sandwiched between the first reflective layer and the second reflective layer. In other words, the display panel is covered by the first reflective layer on the first panel side and by the second reflective layer on the second panel side, wherein both the first reflective layer any the second reflective layer can be transparent. For example, the first reflective layer and the second reflective layer may have a total surface area of the same size or at least 80% of the size of the pixel layer/blocking layer and can be attached to the pixel layer on the first panel side and the blocking layer on the second panel side mechanically, or be glued or laminated, which can be chosen by a person with ordinary skill in the related field. This is of advantage, because the first reflective foil may enhance the perceivability (the ability of a viewer to perceive) of the at least one graphic display object in the second orientation, whereas the second reflective foil may enhance the perceivability of the least one graphic display object in the first orientation.

In one embodiment, the sensor unit may include at least one camera and/or at least one movement sensor and/or at least one infrared sensor and/or at least one proximity sensor. For example, the at least one camera can locate the position of the at least one person and identify if the at least one person is on the first panel side or on the second panel side and send the control signal to the control circuitry. The at least one camera can be a part of a face recognition unit which can be used to identify a predefined user and send the respective control signal to the control circuitry. Furthermore, the at least one infrared sensor can be of advantage, when there is a lack of visible light, such as during the night or fog, in this case, the position of the at least one person can be identified by the at least one infrared sensor and the respective control signal can be sent to the control circuitry. Similarly, proximity sensors, such as radar based sensors or capacitive sensors or laser based sensors can be used to identify the position of the at least one person near the display device.

In one embodiment, the sensor unit may be designed to track a position of the at least one person based on which the sensor unit may be designed to enable the control circuitry to switch the displaying of the at least one graphic display object from one of the first panel side and the second panel side in accordance with the predefined display alignment in one of the respective first orientation and the respective second orientation. This is of advantage, because this can enable the display of the at least one graphic display object according to the position of the at least one person, such that when the person moves from one panel side to the other, such as from the second panel side to the first panel side, for example, entering the vehicle, or from the first panel side to the second panel side, for example, getting out of the vehicle. The switching of the displaying of the at least one graphic display object can ensure a continuous display of the graphic display object to the at least one person.

In one embodiment, in accordance with the physical environment, information represented by the at least one graphic display object can be a predefined text message and/or a predefined graphic message with the at least one graphic display object in accordance with the predefined display alignment in the second orientation. This is of advantage, because the predefined text message and/or a predefined graphic message can be in for of a welcome message or a greeting or an advertisement or a news related message. Furthermore, in a parking phase of the vehicle when the at least one graphic display object can be displayed in the second orientation, then the information represented by the graphic display object can be adapted according a weather condition outside the vehicle and/or a traffic condition and/or location of the vehicle. Hence, an efficient displaying of the information represented by the at least one graphic display object can be realized In one embodiment, the predefined text message and/or the predefined graphic message may include a personal message referring to a predefined user, as signaled by the sensor unit including face recognition sensor and/or a receiver for receiving an identification signal from a mobile device. In other words, a face recognition sensor or other machine vision processing sensor may be used to identify a predefined user in the proximity of the vehicle. Furthermore, the data of the predefined user may be pre-stored in the control circuitry of the vehicle or a backend server unit. Upon recognition of the predefined user, the control circuitry can identify for example the name of the predefined user from the data, that is pre-stored in the control circuitry and/or can communicated with the backend server unit, which in turn can send the related data to the control circuitry. The control circuitry can then be adapted to enable the displaying of a predefined text message including a personal message on the display panel in the second orientation. A further advantage can be that certain personal messages which can be only meant to be displayed to a particular predefined user, can be displayed only to that particular predefined user and not to any other person. This can enable security as well as privacy.

In one embodiment, information represented by the at least one graphic display object may be a predefined parking time with the at least one graphic display object in accordance with the predefined display alignment in the second orientation. In other words, when a parking place at a parking location is found, the vehicle can be driven to the parking place and be parked. Upon the parking of the vehicle, the control circuitry can identify the parking of the vehicle by a GPS unit (global positioning system) which can provide the location of the parking place or by an identification of a stoppage of an engine of the vehicle for a predefined amount of time which can indicate the parking of the vehicle. Upon the parking of the vehicle, the control circuitry can trigger an adjustment of the at least one graphic display object in accordance with the predefined display alignment in the second orientation, such that the display panel can be visibly accessible to the at least one person outside the vehicle. In this situation, the information represented by the at least one graphic display object can be in form of a predefined parking time. The predefined parking time may include the time of parking of the vehicle as well as the amount of time remaining from the allowed amount of time to be parked as per a digital ticket.

Also described herein is a vehicle that includes a display device having a display panel for displaying at least one graphic display object, and control circuitry.

In one embodiment, the control circuitry may be designed to switch a display of at least one graphic display object having a predefined alignment from a first orientation to a second orientation, when a door of the vehicle is opened. In other words, when the door of the vehicle is opened, the control circuitry can estimate that the at least one person, who may be the driver of the vehicle, may get out of the vehicle. Hence, the control circuitry may enable a display at least one graphic display object in the second orientation, such that the at least one graphic display object may be perceivable from outside the vehicle, for example through the windscreen. This is of advantage, because no additional sensor is needed. It is further thinkable, that the control circuitry may be designed to duplicate a display at least one graphic display object having a predefined alignment from a first orientation to a second orientation, when the door of the vehicle is opened.

Further embodiments of the vehicle include features that correspond to features as described above in connection with the embodiments of the display device. For this reason, the corresponding features of the embodiments of the vehicle are not described again.

The vehicle may be a motor vehicle, in particular a passenger vehicle, a truck, a bus or a motorcycle.

BRIEF DESCRIPTION OF THE DRAWINGS

These and other aspects and advantages will become more apparent and more readily appreciated from the following description of an exemplary embodiments, taken in conjunction with the accompanying drawings of which.

DETAILED DESCRIPTION

Figure 1:
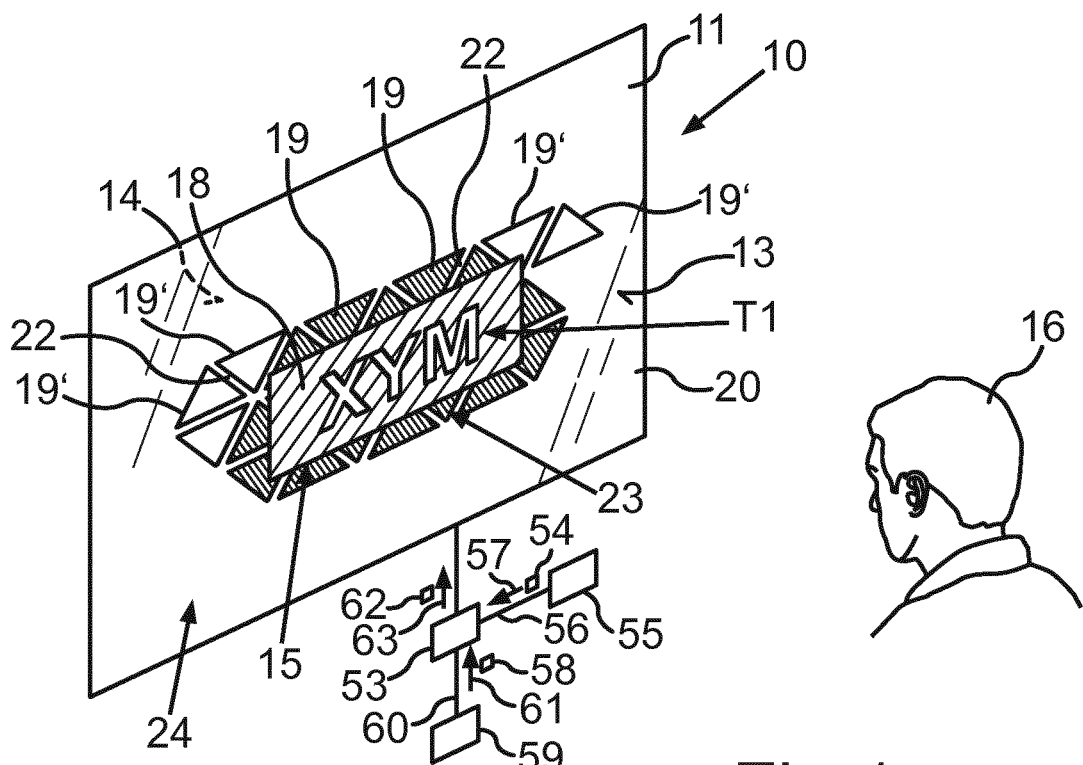
FIG. 1 is a schematic perspective view of an embodiment of the display device.

In the embodiment explained in the following, the described components of the embodiment each represent individual features which are to be considered independently of each other and thereby are also to be regarded as a component in individual manner or in another combination than that shown. Furthermore, the described embodiment can also be supplemented by further features described above.

In the figures identical reference characters indicate elements that provide the same function.

Figure 6:
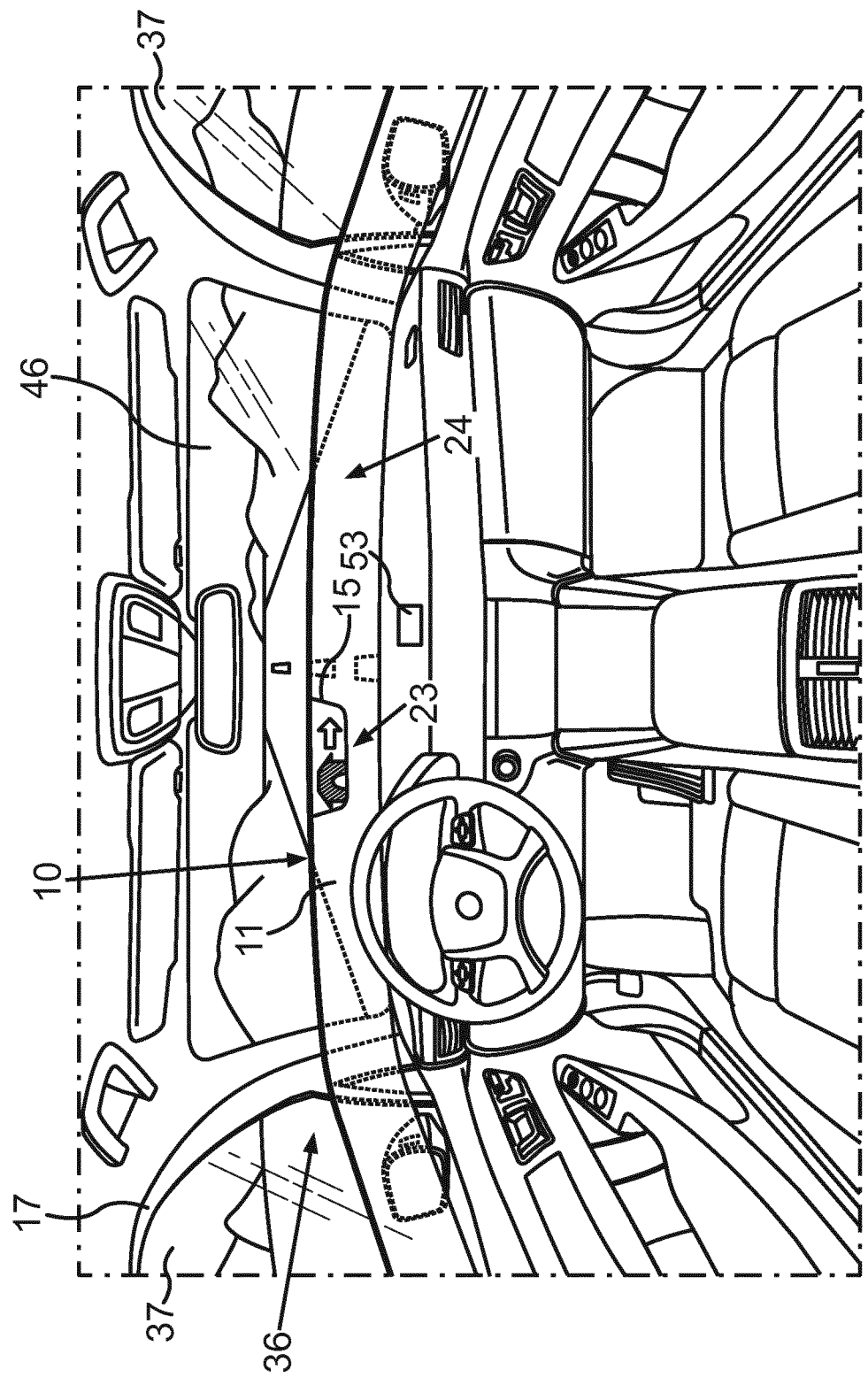
FIG. 6 is a schematic perspective view of an interior region of a vehicle with the display device.

FIG. 1 shows a schematic diagram of an embodiment of a display device 10. The display device 10 has a display panel 11 with a first panel side 13 and a second panel side 14. The display panel 11 is designed to display at least one graphic display object 15, wherein the at least one graphic display object 15 has a predefined display alignment, due to which at least one person 16 is able to perceive the information represented by the at least one graphic display object 15. The display panel 11 can be in form of a touch screen and can function as a graphical user interface (GUI). The at least one person 16, who can be a driver of a vehicle 17, as shown in FIG. 6, can communicate with the other devices (not shown in figures) in the vehicle 17 by a touch or a voice signal or a gesture or by remote control circuitry (not shown in figures) through the display panel 11. The at least one graphic display object 15 may be a logo or an app or a vehicle GUI.

Figure 2:
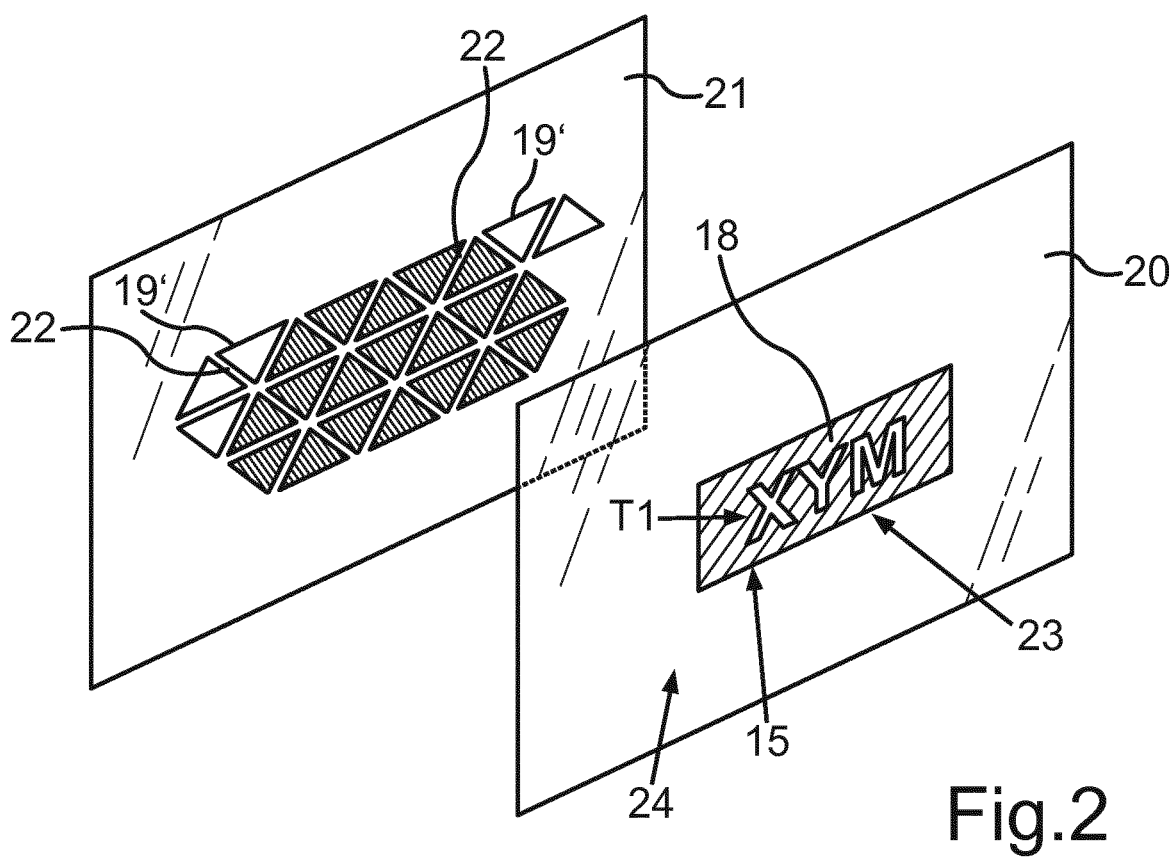
FIG. 2 is an exploded perspective view of an embodiment of the display device with a pixel layer and a blocking layer.

As shown in FIG. 2, the display panel 11 may have a pixel layer 20 with a pixel matrix and a blocking layer 21. The pixel layer 20 can be in form of a TOLED screen. Furthermore, the display device 10 may include control circuitry 53. The control circuitry 53 may be designed to activate at least one pixel element of the pixel matrix for displaying the at least one graphic display object 15, wherein in a inactivated state each pixel element of the pixel matrix may be transparent.

The blocking layer 21 may have a plurality of subareas 19, 19' having an adjustable degree of light transmission. The subareas 19, 19' may be in the form of quadrilateral shapes or triangular shapes or polygonal shapes or a mixture of the aforementioned shapes. As shown in the FIG. 1, the subareas 19, 19' may be in triangular shapes. The subareas 19, 19' of the blocking layer 21 can be designed to allow a transmission of electricity or can be electrically conductive. In order to achieve an adjustable degree of light transmission, a voltage difference can be enabled across each of the subareas 19, 19'. This can enable a transformation of each of the subareas 19, 19' from a transparent state to an opaque state depending on the degree of the voltage difference across that particular subarea 19, 19'. Furthermore, in the case of PDLC or DSLC, the subareas 19, 19' can be transformed to a state between the opaque state and the transparent state. As shown in the FIG. 1 and the FIG. 2, the subareas 19, which are at least covered by the graphic display object 15, are in the opaque state, whereas the other subareas 19', which are not at least covered by the graphic display object 15, are in the transparent state.

The voltage difference across each of the subareas 19, 19' can be adjusted by a wiring for which each of the subareas 19, 19' may be separated or may be surrounded by a space 22 between each of them. The space 22 can enable the wiring across the respective subarea 19, 19'. The wiring can enable the voltage difference across that particular subarea 19, 19'. The control circuitry 53 may be adapted to adjust a respective light transmission to a predetermined individual degree for each of a plurality of the subareas 19, 19' of the blocking layer 21 independent of each of the respective remaining subareas 19, 19'. For the sake of understandability the other subarea 19', as shown in the FIG. 1 and FIG. 2, are in the transparent state.

For example, a display region 23 may be selected on the display panel 11, in order to display the at least one graphic display object 15 on the display region 23. The control circuitry 53 is designed to activate the pixel elements of the pixel layer 20 corresponding to the display region 23, such that the pixel elements corresponding to the display region 23 radiate light in the respective colors associated with the at least one graphic display object 15. However, a remaining part of the display panel 11 outside the display region 23, that is a non-displaying region 24, may remain transparent. In this case, the pixel elements corresponding to the non-displaying region 24 may remain in a inactivated state due to which each of the pixel elements corresponding to the non-displaying region 24 may remain transparent. In order to display the at least one graphic display object 15 on the display panel 11, the control circuitry 53 is designed to determine the respective subareas 19, which are at least partly occupied by the at least one graphic display object 15. The subareas 19, which are at least occupied by the at least one graphic display object 15, are turned opaque by changing the voltage difference across each of the corresponding subareas 19 corresponding to the display region 23. The control circuitry 53 is adapted to adjust the light transmission of the respective subareas 19 to a degree lower than that of the subareas 19', which are not at least partly occupied by the at least one graphic display object 15.

Figure 3:
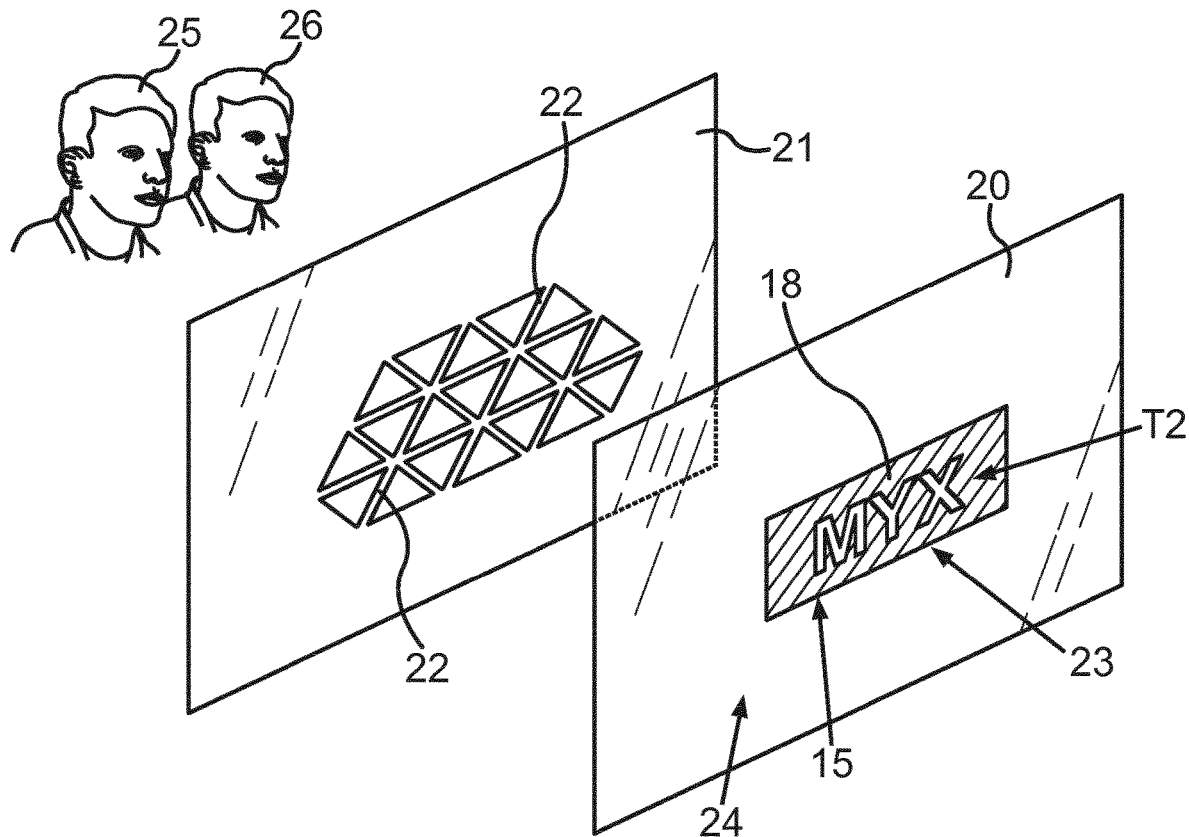
FIG. 3 is an exploded perspective view of an embodiment of the display device with a pixel layer and a blocking layer.

The control circuitry 53 may be designed to estimate a physical environment condition based on a control signal 54 signaled by a sensor unit 55. The sensor unit 55 may include at least one camera and/or at least one movement sensor and/or at least one infrared sensor and/or at least one proximity sensor (not shown in the figures). The sensor unit 55 may be designed to identify the presence of the at least one person 16 at a predefined threshold distance from the display device 10. Furthermore, the sensor unit 55 may be designed to identify if the at least one person 16 is on the first panel side 13 or on the second panel side 14. The sensor unit 55 may be designed to identify the presence of the at least one person 16 on the first panel side 13 and/or the presence of the plurality of persons 25, 26 on the second panel side 14 at the predefined threshold distance from the display device 10, as shown in FIG. 3. The sensor unit 55 may send the control signal 54 along a path 56, as shown by an arrow 57.

Based on the physical environment condition, the control circuitry 53 is adapted to enable the displaying of the at least one graphic display object 15 in accordance with the predefined display alignment in one of a first orientation T1 and a second orientation T2. An output of the at least one graphic display object 15 may be requested by a display signal 58 that may be received by the control circuitry 53, for example from an electronic control unit 59 of the vehicle 17 along a path 60, as shown by an arrow 61. In other words, upon receiving the control signal 54 and the display signal 58, the control circuitry 53 may enable the display of the at least one graphic display object 15 by actuating the corresponding pixel elements of the pixel layer 20 by an actuation signal 62, as shown by an arrow 63.

In the first orientation T1, the at least one graphic display object 15 may be perceivable on the first panel side 13 in the predefined alignment. For the sake of understandability, the at least one graphic display object 15 is in the form of a text message "XYM", for example, yellow in color, and with a colored background 18, which can be, for example, blue in color (represented by indented lines with broad spaces). The at least one graphic display object 15 can be in the first orientation T1, such that the at least one graphic display object 15 can be perceived by the at least one person 16, on the first panel side 13, as the text message "XYM". In other words, the at least one person 16, who can be seated inside the vehicle 17, can be able to perceive the text message "XYM" represented by the at least one graphic display object 15. For the perceivability of the at least one person 16, on the first panel side 13, that is inside the vehicle 17, the subareas 19 may be adjusted to the opaque state. However, the remaining subareas 19', which are not at least occupied by the least one graphic display object 15 may remain in the transparent state.

Figure 7:
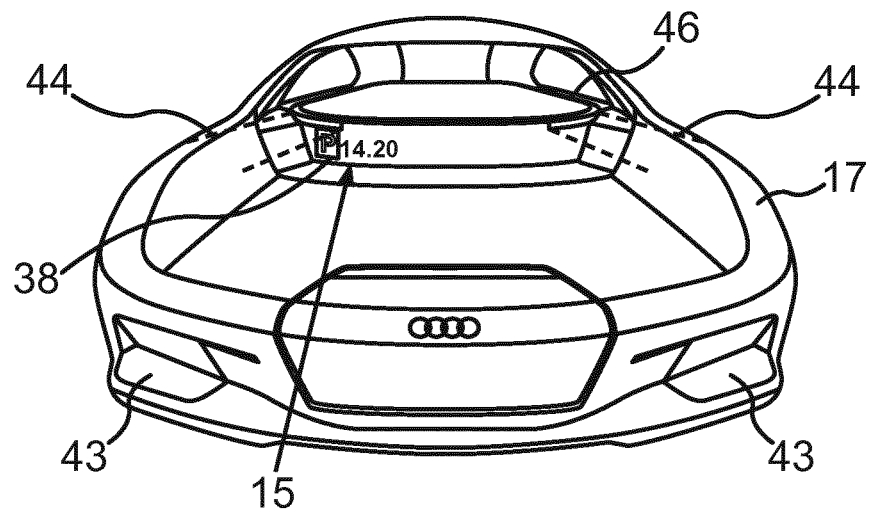
FIG. 7 is a front view of the vehicle with the display device.

The predefined display alignment for the at least one graphic display object 15 may be that the text message "XYM" is to be perceived as "XYM" by the at least one person 16 inside the vehicle or by a plurality of persons 25, 26 outside the vehicle, as shown in FIG. 3. However, if the test message "XYM" is to be perceivable by the plurality of persons 25, 26, who are outside the vehicle 17, that is on the second panel side 14, then the at least one graphic display object 15 representing the text message "XYM" has to be displayed in the second orientation T2, that is as a mirror image of "XYM", that is as "MYX" on the pixel layer 20. Furthermore, the subareas 19, 19' of the blocking layer 21 need to be adjusted to the transparent state, so that the displayed text message "MYX" represented by the at least one graphic display object 15 on the pixel layer 20 can be visible through the subareas 19, 19' of the blocking layer 21. Hence, the text message "MYX" in the second orientation T2 can be perceived by the plurality of persons 25, 26 outside the vehicle 17 as the text message "XYM". For example, the display device 10 can be integrated in a dashboard 45 of the vehicle 17, as shown in FIG. 6, such that on the first panel side 13 of the display panel 11, the at least one graphic display object 15 can be perceivable by the at least one person 16, that is from inside the vehicle 17 and such that the on second panel side 14 of the display panel 11, the at least one graphic display object 15 can be perceivable by the plurality of persons 25, 26 from outside the vehicle through the transparent windscreen 46, as shown in FIG. 7, wherein the at least one graphic display object 15 representing a predefined parking time 38, for example "14:20", may be displayed by the display panel 11 in the second orientation T2.

The control circuitry 53 may be adapted to adjust a respective light transmission to a predetermined individual degree for each of the plurality of the predetermined subareas 19, 19' independent of each of the respective remaining subareas 19, 19' in accordance with the physical environment condition.

Figure 4:
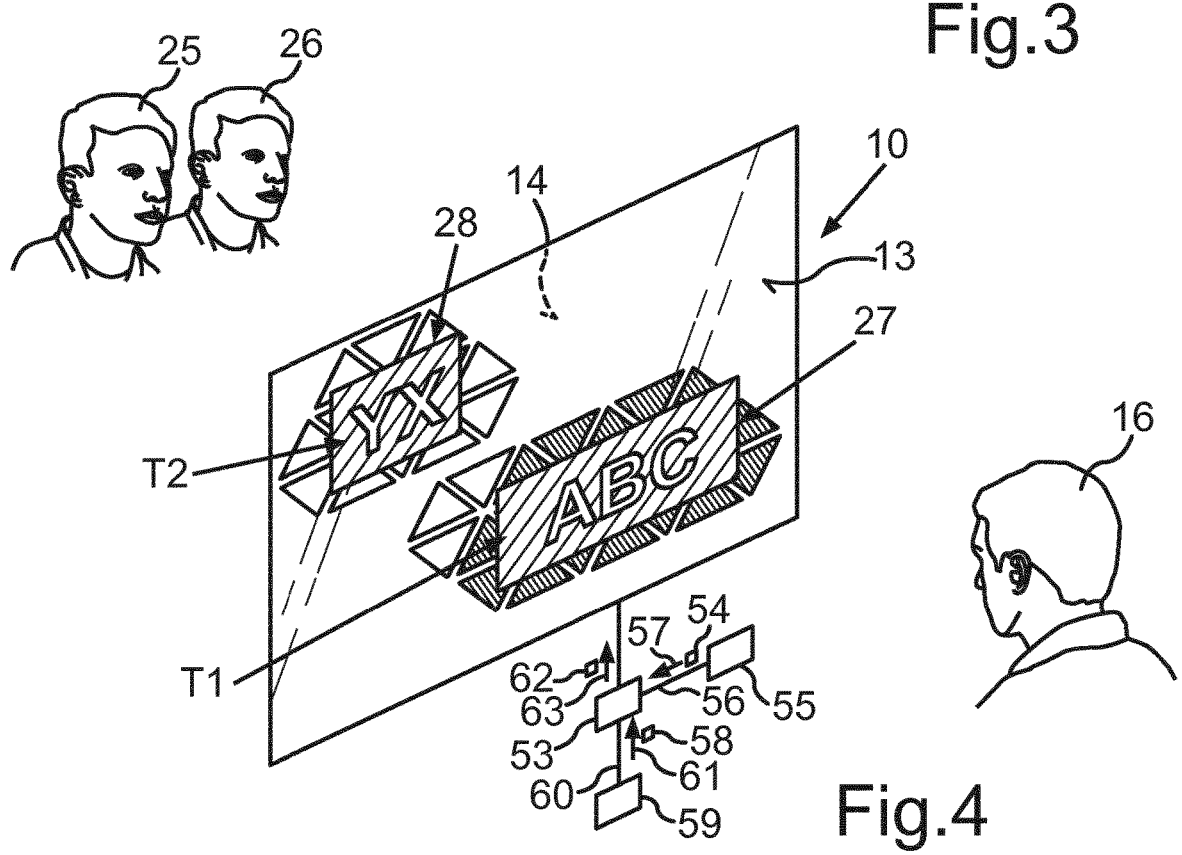
FIG. 4 is a schematic perspective view of an embodiment of the display device.

FIG. 4 depicts the display device 10, wherein the at least one graphic display object 15 includes a first graphic display object 27 and a second graphic display object 28. Information represented by the first graphic display object 27 is a text message "ABC" in the first orientation T1, so that the at least one person 16 can be able to perceive the first graphic display object 27 on the first panel side 13. Furthermore, information represented by the second graphic display object 28 is a text message "XY" in the second orientation T2, so that the plurality of persons 25, 26, who are outside the vehicle 17, can be able to perceive the second graphic display object 28 on the second panel side 14. Hence, in order to enable the displaying of the second graphic display object 28 with the text message "XY", the second graphic display object 28 is generated as a text message "YX" on the pixel layer 20 on the first panel side 13, so that the mirror image of "YX" is perceivable as "XY" on the second panel side 14 by the plurality of persons 25, 26.

Figure 5:
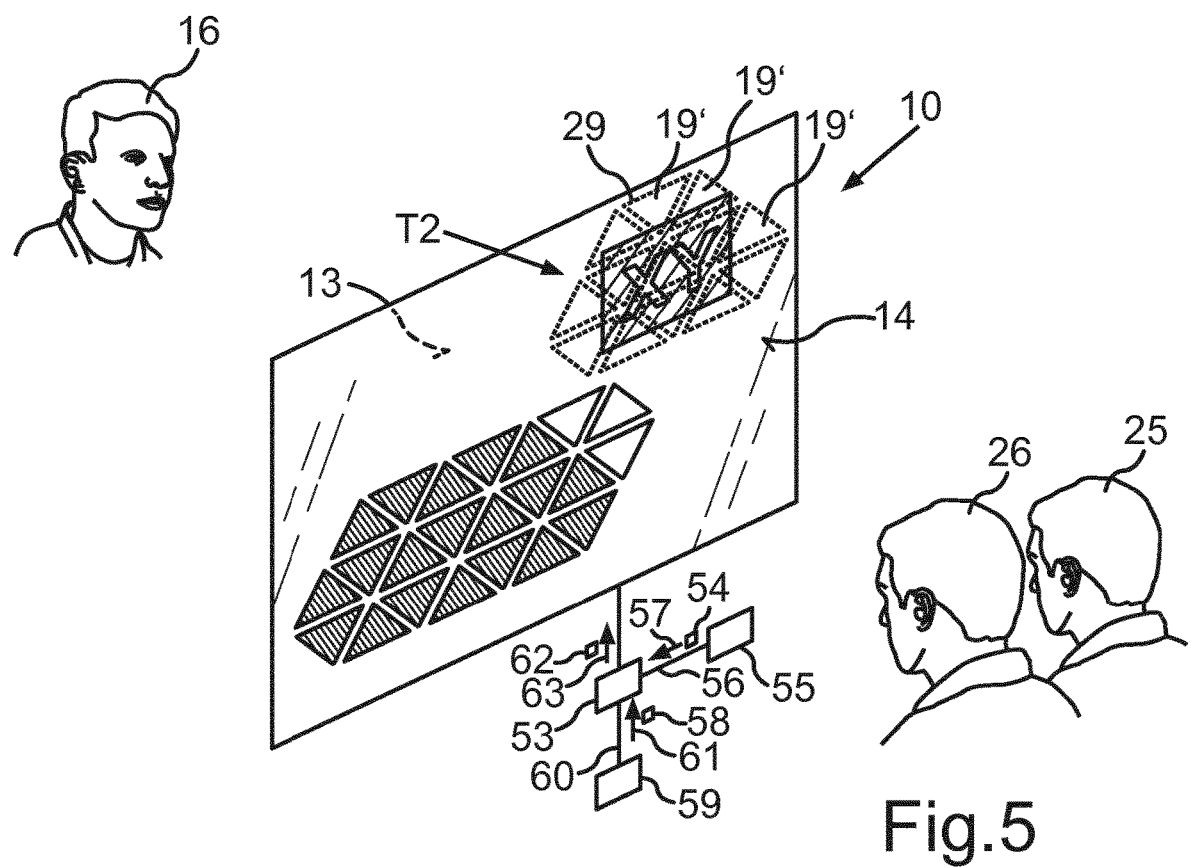
FIG. 5 is a schematic perspective view of an embodiment of the display device.

FIG. 5 depicts the display device 10, as perceived by the plurality of persons 25, 26 on the second panel side 14. Furthermore, in order to enable the plurality of persons 25, 26 to view the second graphic display object 28, the predetermined subareas 19, 19' corresponding to the second graphic display object 28 are adjusted to the transparent state. For the sake of understandability, the predefined subareas 19' in the transparent state, which lie in front of the second graphic display object 28 are depicted by dashed lines 29 in FIG. 5. Since on the second panel side 14, the pixel layer 20 is located behind the blocking layer 21 with respect to the plurality of persons 25, 26. Moreover, in order to enable the at least one person 16 to view the first graphic display object 27 clearly, the predetermined subareas 19, 19' corresponding to the first graphic display object 27 are adjusted to the opaque state. Hence, the first graphic display object 27 is not perceivable by the plurality of persons 25, 26, as it is covered by the corresponding predefined subareas 19, 19'.

Furthermore, the sensor unit 55 may be designed to track a position of the at least one person 16 based on which the sensor unit 55 may be designed to enable the control circuitry 53 to switch the displaying of the at least one graphic display object 15 from one of the first panel side 13 and the second panel side 14 in accordance with the predefined display alignment in one of the respective first orientation T1 and the respective second orientation T2.

FIG. 6 depicts the vehicle 17 with the display device 10. The vehicle 17 can be a motor vehicle which can be driven manually or can be self-driving. Furthermore, the display device 10 can be integrated in the vehicle 17 in front of the windscreen 46, that is in a region in front of the at least one person 16 inside the vehicle 17. It is further thinkable, that such a display device 10 can be integrated in other parts of the vehicle 17, for example on a window panels 37 of the vehicle 17 or window panels of a passenger vehicle, such as a bus. The at least one person 16 can access the display device 10 comfortably while driving, since the display device 10 can be integrated in front of the windscreen 46 of the vehicle 17 and can be located at a reachable distance from the at least one person 16. The at least one person 16 can be able to perceive the external environment outside the vehicle 17 through the windscreen 46 and through the non-display region 24 of the display panel 11 which can be transparent.

FIG. 7 shows a front view of the vehicle 17, wherein in accordance with the physical environment condition, information represented by the at least one graphic display object 15 can be the predefined parking time 38, for example "14:20", wherein the at least one graphic display object 15 may be in accordance with the predefined display alignment in the second orientation T2.

Figure 8:
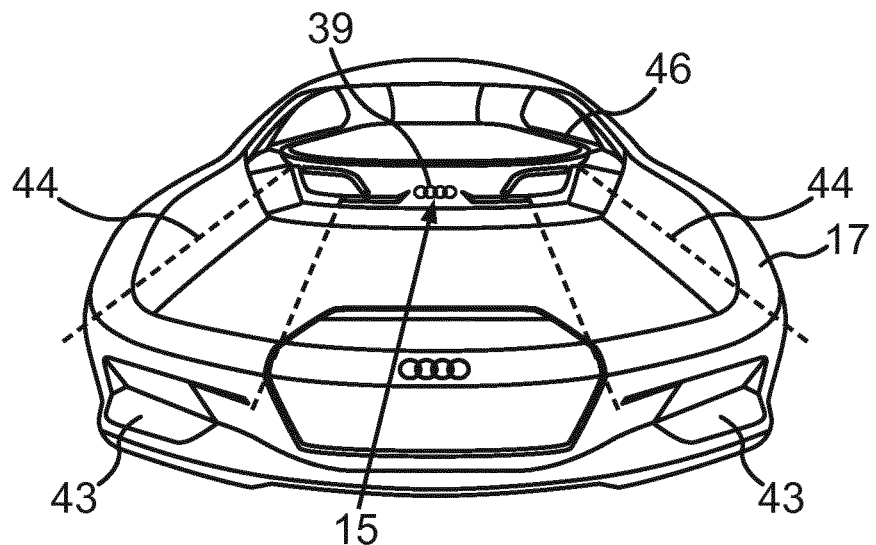
FIG. 8 is a front view of the vehicle with the display device.

FIG. 8 shows the front view of the vehicle 17, in accordance with the physical environment condition, information represented by the at least one graphic display object 15 can be a predefined text message and/or a predefined graphic message 39 with the at least one graphic display object 15 in accordance with the predefined display alignment in the second orientation T2. Furthermore, the predefined text message and/or the predefined graphic message 39 may include a personal message referring to a predefined user (not shown in figures), as signaled by a face recognition sensor (not shown in figures) and/or a receiver for receiving an identification signal form a mobile device (not shown in figures). Moreover, the at least one graphic display object 15 can correspond to a functionality of a head light 43 and/or a blinker 44 of the vehicle 17, wherein the at least one graphic display object 15 may be in accordance with the predefined display alignment in the second orientation T2. Furthermore, the at least one graphic display object 15 can correspond to a functionality of a light emitting device, for example, a parking light.

Figure 9:
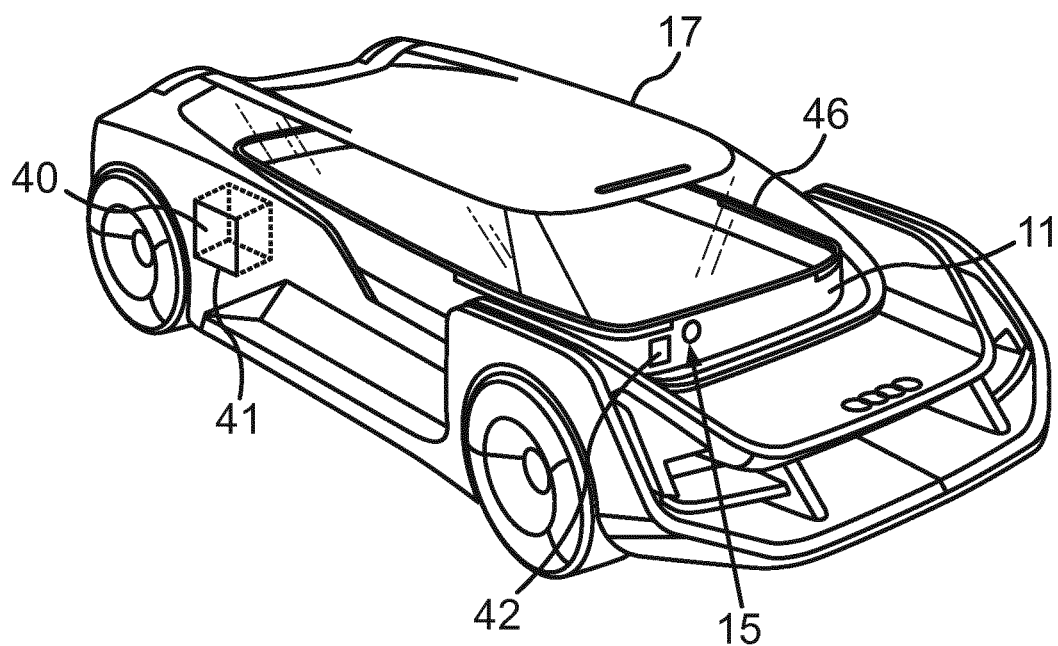
FIG. 9 is a schematic perspective view of the vehicle with the display device.

FIG. 9 shows a schematic illustration of the vehicle 17, wherein the vehicle 17 can be used as a packet station or a delivery station, such that the vehicle 17 may have a delivery compartment 40 with a compartment door 41. The at least one person 16 can park the vehicle 17 at a parking location and can login to a website of a delivery company using the display panel 11 and order a parcel. Upon which the control circuitry 53 can send a registration signal to a backend server unit (not shown in the figures), for example to the backend server unit of the delivery company. Upon receiving the registration signal, a booking of the vehicle 17 as a packet station can be enabled, moreover, information about the location of the vehicle 17 and the required parcel information can be included in the registration signal. Furthermore, upon receiving the registration signal, the backend server unit can send a signal with a booking code to the control circuitry 53.

A delivery personal of the delivery company with the parcel can travel to the location of vehicle 17. Upon reaching the location of the vehicle 17, the delivery personal can send a matching signal to the control circuitry 53 of the vehicle 17, from his smart phone wirelessly. The matching signal can include the booking code. The matching signal can be received by the control circuitry 53. Upon receiving the matching signal, the control circuitry 53 can send a vehicle activation signal to the electronic control unit 59 of the vehicle 17. The electronic control unit 59 upon receiving the vehicle activation signal can open the compartment door 41, so that the delivery personal can place the parcel inside the delivery compartment 40. Furthermore, upon a placement of the parcel inside the delivery compartment 40, the compartment door 41 can be locked by the electronic control unit 59. The electronic control unit 59 can further send a delivery signal to the control circuitry 53 of the display device 10. Upon receiving the delivery signal, information represented by the graphic display object 15 can be in form of delivery message 42, which can be displayed in the second orientation T2 and/or the first orientation T1, in case the at least one person 16 is inside the vehicle 17, on the display panel 11 notifying that the parcel has been delivered.

Figure 10:
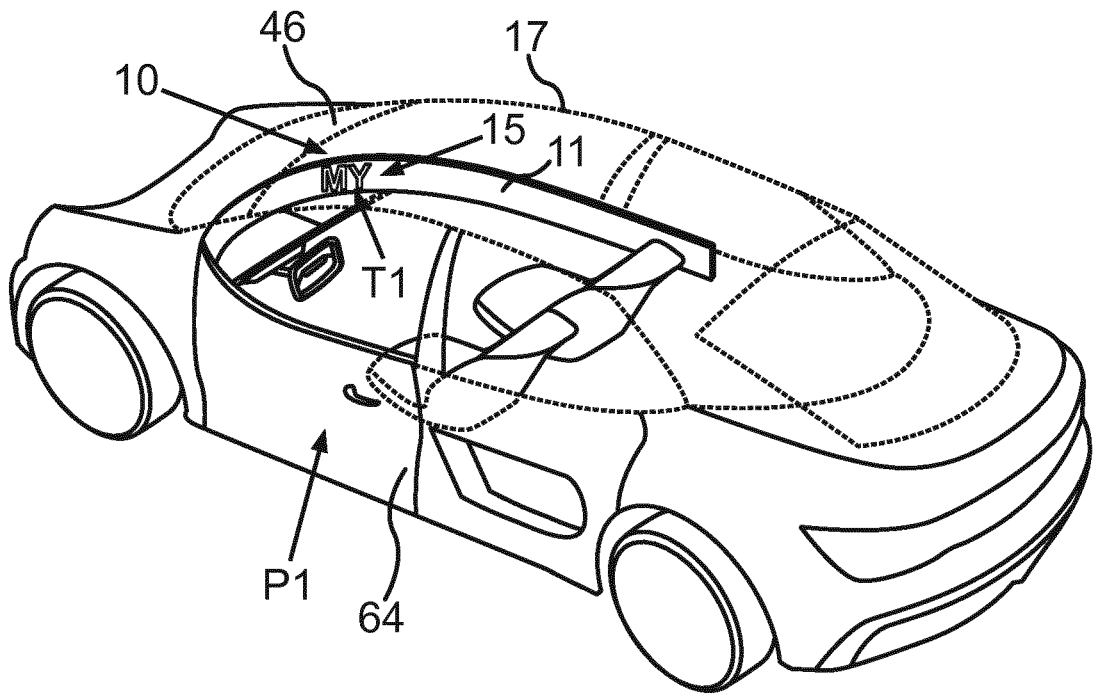
FIG. 10 is a schematic perspective view of the vehicle with the display device.
Figure 11:
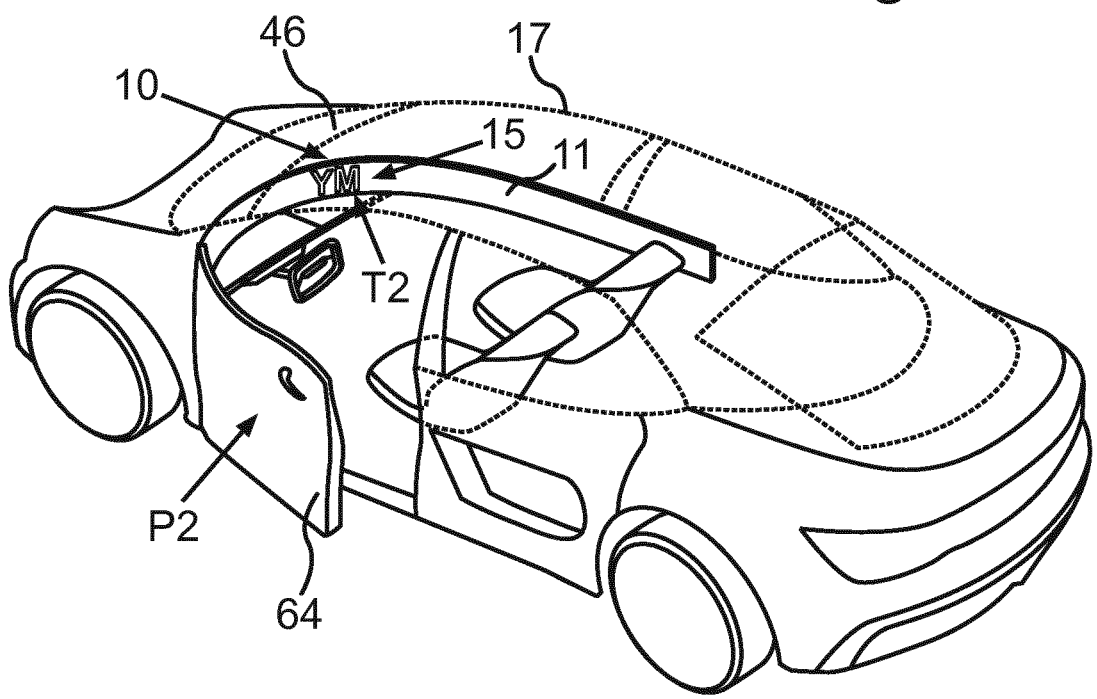
FIG. 11 is a schematic perspective view of the vehicle with the display device.

FIG. 10 shows a schematic illustration of the vehicle 17, wherein the at least one graphic display object 15 can be in the first orientation T1, such that the at least one graphic display object 15 can be perceived by the at least one person 16 inside the vehicle 17, on the first panel side 13, as a text message "MY". A door 64 of the vehicle 17 may be in a closed position P1. The at least one person 16 can be able to perceive the text message "MY" represented by the graphic display object 15. As shown in FIG. 11, the control circuitry 53 may be designed to switch a display of at least one graphic display object 15 having a predefined alignment from the first orientation T1 to the second orientation T2, when the door 64 of the vehicle 17 is opened to an open position P2. For example, the at least one person 16 may open the door 64 to get out of the vehicle 17. In second orientation T2, the control circuitry 53 may actuate the corresponding pixel elements of the graphic display object 15 on the pixel layer 20, as a text message "YM", so that the message is perceivable as "MY" from outside the vehicle 17, that from the second panel side 14.

Figure 12:
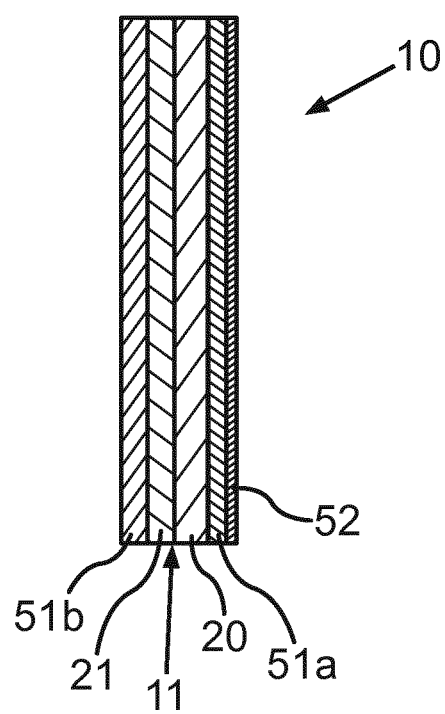
FIG. 12 is a cross section of the display device with transparent reflective foils.

FIG. 12 shows a cross section of the display device 10, wherein the display device 10 may include two transparent reflective foils, namely a first reflective layer 51a and a second reflective layer 51b. The transparent reflective foils may enable a reflection of light so that an image displayed on the display panel 11 can be perceivable from both the first panel side 13 as well as from the second panel side 14. The display panel 11 may be sandwiched between the first reflective layer 51a and the second reflective layer 51b. In other words, the display panel 11 may covered by the first reflective layer 51a on the first panel side 13 and by the second reflective layer 51b on the second panel side 14, wherein both the first reflective layer 51a and the second reflective layer 51b can be transparent. The first reflective layer 51a can be attached to the pixel layer 20 on the first panel side 13 and the second reflective layer 51b can be attached to the blocking layer 21 on the second panel side 14 mechanically, or be glued or laminated, which can be chosen by a person with ordinary skill in the related field. It is further thinkable, that the display panel 11 may have a touch-foil 52. Furthermore, the display panel 11 may have the touch-foil 52 on both sides of the display panel 11 (not shown in the figures).

Overall, the examples show how the display device 10 enables the display of the at least one graphic display object 15 on the display panel 11 in an efficient manner, as it is provided by the invention.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. A display device, comprising:
a display panel having a first panel side, a second panel side, and a pixel layer with a pixel matrix of pixel elements, each pixel element of the pixel matrix being transparent in a non-actuated state;
a sensor configured to
detect a distance of at least one person as within a predefined threshold distance from the display device, and
generate a control signal indicating on which of the first panel side and the second panel side the at least one person is positioned;
at least one of a face recognition system, connected to the sensor, configured to generate an identification signal, and a receiver configured to receive the identification signal from a mobile device; and
a processor, connected to the display panel and the sensor, configured to
estimate, based on the control signal, a physical environment condition, and
control the display panel, in dependence upon the physical environment condition, to display information represented by at least one graphic display object, by actuating at least one pixel element of the pixel matrix, in accordance with a predefined display alignment in one of a first orientation and a second orientation, where the at least one graphic display object is perceivable by the at least one person respectively in the first orientation on the first panel side in the predefined display alignment and in the second orientation on the second panel side in the predefined display alignment as at least one of a predefined text message and a predefined graphic message, including a personal message referring to a predefined user identified by the identification signal.

2. The display device according to claim 1,
wherein the display panel comprises a blocking layer with a plurality of predetermined subareas, each having an adjustable degree of light transmission, and
wherein the processor is further configured to adjust a respective light transmission to a predetermined individual degree for each of the plurality of the predetermined subareas independent of remaining subareas in accordance with the estimated physical environment condition.

3. The display device according to claim 2,
further comprising a first reflective layer and a second reflective layer, and
wherein the display panel is sandwiched between the first reflective layer and the second reflective layer.

4. The display device according to claim 3, wherein the sensor comprises at least one of a camera, a movement sensor, an infrared sensor and a proximity sensor.

5. The display device according to claim 4,
wherein the sensor is further configured to track a position of the at least one person, and
wherein the processor is further configured to switch displaying of the at least one graphic display object between the first panel side and the second panel side in accordance with the predefined display alignment in the first orientation and the second orientation, respectively, based on the position of the at least one person.

6. The display device according to claim 5, wherein the information represented by the at least one graphic display object is a predefined parking time with the at least one graphic display object displayed in accordance with the predefined display alignment in the second orientation.

7. The display device according to claim 1,
further comprising a first reflective layer and a second reflective layer, and
wherein the display panel is sandwiched between the first reflective layer and the second reflective layer.

8. The display device according to claim 1, wherein the sensor comprises at least one of a camera, a movement sensor, an infrared sensor and a proximity sensor.

9. The display device according to claim 1,
wherein the sensor is further configured to track a position of the at least one person
wherein the processor is further configured to switch displaying of the at least one graphic display object between the first panel side and the second panel side in accordance with the predefined display alignment in the first orientation and the second orientation, respectively, based on the position of the at least one person.

10. A vehicle, comprising:
a chassis;
a door; and
a display device including
a display panel having a first panel side, a second panel side, and a pixel layer with a pixel matrix of pixel elements, each pixel element of the pixel matrix being transparent in a non-actuated state,
a sensor configured to
detect a distance of at least one person as within a predefined threshold distance from the display device, and
generate a control signal indicating on which of the first panel side and the second panel side the at least one person is positioned, and
a processor, connected to the display panel and the sensor, configured to
estimate, based on the control signal, a physical environment condition,
control the display panel, in dependence upon the physical environment condition, to display at least one graphic display object, by actuating at least one pixel element of the pixel matrix, in accordance with a predefined display alignment in one of a first orientation and a second orientation, where the at least one graphic display object is perceivable by the at least one person respectively in at least one of the first orientation on the first panel side in the predefined display alignment and in the second orientation on the second panel side in the predefined display alignment; and
switch display of the at least one graphic display object in the predefined alignment from the first orientation to the second orientation, when the door of the vehicle is opened.

11. The vehicle according to claim 10,
wherein the display panel comprises a blocking layer with a plurality of predetermined subareas, each having an adjustable degree of light transmission, and
wherein the processor is further configured to adjust a respective light transmission to a predetermined individual degree for each of the plurality of the predetermined subareas independent of remaining subareas in accordance with the estimated physical environment condition.

12. The vehicle according to claim 10,
wherein the display device further comprises a first reflective layer and a second reflective layer, and wherein the display panel is sandwiched between the first reflective layer and the second reflective layer.

13. The vehicle according to claim 10,
wherein the sensor is further configured to track a position of the at least one person, and
wherein the processor is further configured to switch displaying of the at least one graphic display object between the first panel side and the second panel side in accordance with the predefined display alignment in the first orientation and the second orientation, respectively, based on the position of the at least one person.

14. The vehicle according to claim 10, wherein in accordance with the physical environment condition, information represented by the at least one graphic display object is at least one of a predefined text message and a predefined graphic message, with the at least one graphic display object displayed in accordance with the predefined display alignment in the second orientation.

15. The vehicle according to claim 10,
further comprising an individual identifying system outputting an identification signal, including at least one of a face recognition system connected to the sensor and a receiver configured to receive the identification signal from a mobile device, and
wherein the at least one of the predefined text message and the predefined graphic message includes a personal message to a predefined user identified based on the identification signal.

* * * * *